US006056532A

United States Patent [19]

Pagel

[11] Patent Number: 6,056,532

[45] Date of Patent: May 2, 2000

[54] PROCESS FOR MANUFACTURING THE HEAD SURFACES OF DIES COOPERATING WITH CYLINDRICAL PRESSURE ROLLERS FOR ROTARY PRESSES AND DIE MANUFACTURED ACCORDING TO THIS PROCESS

[75] Inventor: Jürgen Pagel, Berlin, Germany

[73] Assignee: Korsch Pressen GmbH, Germany

[21] Appl. No.: 08/960,638

[22] Filed: Oct. 30, 1997

[30] Foreign Application Priority Data

Oct. 30, 1996 [DE] Germany ........................... 196 46 536

[51] Int. Cl.$^{7}$ ..................................................... B29C 43/08

[52] U.S. Cl. .......................... 425/345; 425/353; 425/469; 451/28; 451/62

[58] Field of Search ..................................... 425/345, 353, 425/469; 451/62, 28

[56] References Cited

U.S. PATENT DOCUMENTS

| | | | |
|---|---|---|---|
| 2,068,619 | 1/1937 | Bailey | 425/353 |
| 3,891,375 | 6/1975 | Pilewski et al. | 425/344 |
| 3,912,441 | 10/1975 | Shimada et al. | 425/348 |
| 4,057,381 | 11/1977 | Korsch | 425/345 |
| 4,817,006 | 3/1989 | Lewis | 425/170 |
| 5,699,273 | 12/1997 | Hinzpeter et al. | 364/506 |

FOREIGN PATENT DOCUMENTS

| | | |
|---|---|---|
| 0 723 858 A1 | 7/1996 | European Pat. Off. . |
| 195 12 655 A1 | 1/1996 | Germany . |
| 195 02 596 A1 | 8/1996 | Germany . |

OTHER PUBLICATIONS

Shimada Keiji Apr. 6, 1993 Lever of Rotary Type Powder Forming Machine Patent Abstracts of Japan.

*Primary Examiner*—Harold Pyon
*Assistant Examiner*—Mark A. Wentink
*Attorney, Agent, or Firm*—McGlew and Tuttle, P.C.

[57] ABSTRACT

A process for manufacturing head surfaces of dies cooperating with cylindrical press rolls for rotary presses. To avoid the high Hertzian stresses occurring dies for rotary presses during the interaction of the die head and the press roll, the present invention provides for designing instantaneous surface lines of the press roll extending through the instantaneous contact points between the head surface of the die head and the press roll under the action of the press roll on the die head as a set of continuously consecutive contact lines on the head surface of the die head by a tool.

16 Claims, 5 Drawing Sheets

PROCESS FOR MANUFACTURING THE HEAD SURFACES OF DIES COOPERATING WITH CYLINDRICAL PRESSURE ROLLERS FOR ROTARY PRESSES AND DIE MANUFACTURED ACCORDING TO THIS PROCESS

FIELD OF THE INVENTION

The present invention pertains to a process for manufacturing the head surfaces of dies cooperating with cylindrical pressure rollers for rotary presses and to dies manufactured according to this process.

BACKGROUND OF THE INVENTION

A process for preparing a force-displacement diagram of the press dies of a rotary tabletting press (rotary press), by which the compression characteristics of the material being pressed on a rotary press can be determined under production conditions with a minimum measuring effort, has been known from DE 195 02 596 A1. The course of the pressing force of at least one press die is measured at angular increments and stored in a computer. One revolution of the rotor corresponds to. e.g., 3,600 angular pulses. A force is assigned to each of these pulses and correspondingly stored in the computer. Furthermore, the theoretical values for the displacement of the press die are stored in the computer. These are to be calculated via corresponding geometric equations. The diameter of the press roll, the shape of the die head, and the relative position of these parts in relation to one another, are decisive for this theoretical value. A correction table, in which essential factors influencing the actual displacement of the die, such as the spring-back of the tabletting press and the flattening of the die and press roll due to the Hertzian stress or pressure, are taken into account, is stored in the computer. Both the spring-back and the Hertzian stress depend on the pressing force applied to the press die. Thus, force-dependent correction factors, which are to be deducted from the theoretical values for the die displacement to determine the actual die displacement, are determined. Since the die head has a radius in the circumferential area only, but is flat in the middle, the value of the Hertzian stress depends on the relative position of the die head in relation to the press roll. The correction values therefore take into account the dependence of the Hertzian flattening on the angular position of the press die. The vertical movement of a die pair can be calculated for each angle of rotation by mathematical methods, and the overall theoretical displacement must be corrected by the overall spring-back of the tabletting press and by the Hertzian flattening between the die head and the press roll.

This prior-art process is based on the usual head shape of dies for rotary presses, namely, on the circular, flat and flattened middle plateau surface and the edge area having a radius in its cross section. These prior-art die head shapes are sufficient for weak pressing forces to handle the pressing forces needed during continuous operation at the contact area between the press roll and the die. The die head has the circular plateau surface, which is joined by the toroidal intake surface. At the highest point of the toroidal surface, a punctiform contact becomes established at the maximum pressing force between the cylindrical press roll and the toroidal surface of the die head, which is arched in two planes, and consequently a relatively high Hertzian stress develops, which is the principal parameter for the force transmissible between the two bodies of the pair, namely, the die head and the press roll. The pressing force of the rotary press is limited as a result.

Based on the pitting occurring at high pressing forces in the die head-press roll pair, a limit of the permissible pressing forces has already been reached and sometimes exceeded with the prior-art die head shapes. The prior-art die head shapes with the punctiform contact can no longer be improved substantially for increasing the permissible pressing forces in future developments of the industrial rotary presses. If a pressing force of 80 kN and a prior-art die head shape are assumed, a Hertzian stress exceeding 4,300 N/mm$^2$, which corresponds to a maximum permissible Hertzian stress for the pair formed by the die head and the press roll, is obtained at the transition of the toroidal surface into the plateau surface in the contact zone of the die head and the press roll with manufactured dies.

SUMMARY AND OBJECTS OF THE INVENTION

The basic object of the present invention is therefore to design the die head-cylindrical press roll pair such that high Hertzian stresses or pressures will be avoided.

To accomplish this object, the present invention provides for designing the surface lines of the press roll extending through the instantaneous contact point between the die head and the press roll under the action of the cylindrical press roll on the die head as a set of consecutive contact lines on the head surface of the die by means of a tool. The die head shape according to the present invention has a linear contact between the die head and the press roll in all engaged positions between the cylindrical press roll and the die head, avoiding local minimal radii of curvature of the die head, with a substantially lower Hertzian stress, as a result of which a significantly stronger pressing force can be permitted, on the whole.

The head surface of dies for rotary presses is designed by means of the process according to the present invention such that a linear contact takes place between the press roll and the die head after an intended immersion function of the die into the matrix in all engaged positions between the press roll and the die head, and a locally minimal radius of curvature is not present in any engaged position. The die head is prepared according to any desired, selectable immersion function depending on the angle of rotation, such that the instantaneous surface lines of the cylindrical press roll in the instantaneous contact points between the die head and the press roll are transferred onto the die by suitable movements of the tool. A surface curved in two planes is thus formed due to the continuous transition from one engaged position to the next engaged position on the top side of the die head, but the radius of curvature of this curved surface along the contact line is infinitely great. On the one hand, this surface satisfies the preset immersion behavior of the die into the matrix during the turning up of the die under the press roll, and, on the other hand, a linear contact develops between the die head and the cylindrical press roll in each engaged position with a relatively low Hertzian stress even at a high pressing force, because locally minimal radii of curvature are avoided. Thus, the surface of the die head is designed as a radial-linear surface by the process according to the present invention as a function of the contact lines of the cylindrical press roll, so that the cylindrical press roll and the die head come into contact with each other exclusively in radial-linear contact lines. As a result, punctiform contacts and consequently high Hertzian stresses and resulting erosions (pitting) are avoided.

The die designed according to the present invention for rotary presses with a die head surface cooperating with cylindrical press rolls is characterized in that the die head surface has a set of consecutive contact lines, which are formed on the head surface of the die from the instantaneous surface lines of the press roll extending between the die head and the press roll. Thus, there is only a linear contact with any desired intake curve of the die heads into the press rolls, with the radius of curvature along a contact line decreasing toward the center of the press. As a result, a Hertzian stress that is greater toward the center of the press than at the outer edge of the die is generated along this instantaneous contact line.

In another embodiment of the present invention, assuming that the press roll is mounted in a tilt-proof manner, the set of contact lines is designed to be tilted by a few hundredths of one mm toward the side of the die head directed toward the center of the rotary press. A gap thus develops on the side of the die head tilted toward the center of the press, i.e., the center of rotation, in the unloaded state of the pair formed by the press roll and the die head, while a nearly uniform Hertzian stress develops over the entire engagement line during loading, as a result of which maximum load-bearing capacity of the press roll-die head pair is made possible.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated..

DESCRIPTION OF THE PREFERRED EMBODIMENT

Figure 1:
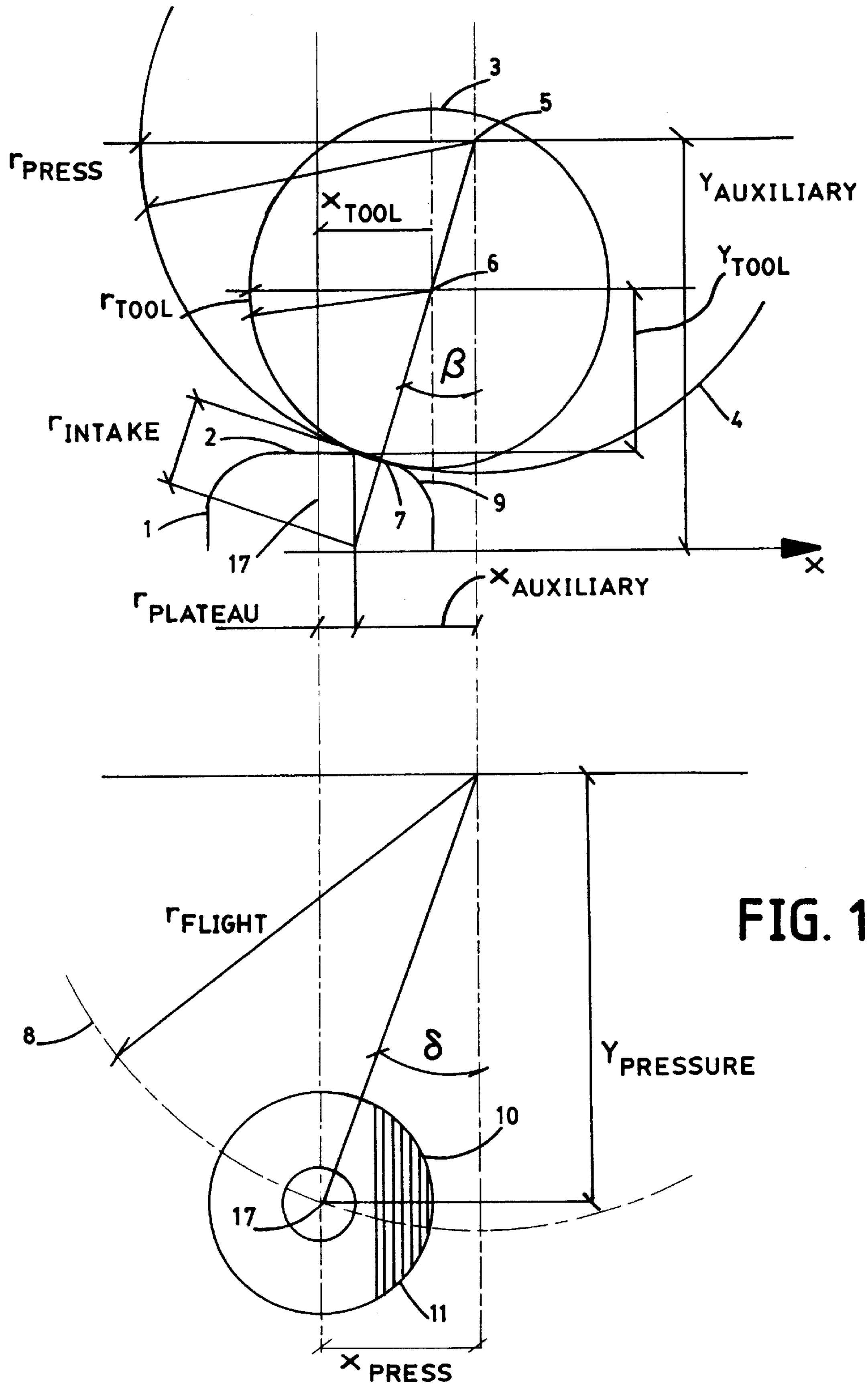
FIG. 1 is a general front view (top representation) and a general top view (bottom representation) of the pair formed by the die head and the cylindrical press roll of a rotary press.

Referring to the drawings, FIG. 1 is the geometric equation between the intake curve of the die head 1 into the matrix, not shown, and the tool path necessary for generating the head surface 2 of the die head 1 for a cylindrical tool 3. The tool movements necessary to manufacture this die surface 2 are obtained from the following equations for, e.g., a die 1 with plateau surface and with a circular die intake into the press roll 4 as a function of the angle of rotation δ of the tool:

$$x_{press}(\delta) = r_{flight} * \sin\delta$$

$$x_{auxiliary}(\delta) = d_{press}(\delta) r_{plateau}$$

-continued $$y_{auxiliary}(\delta) = \sqrt{(r_{intake} + r_{press})^2 - x_{auxiliary}(\delta)^2}$$

$$y_{press}(\delta) = y_{auxiliary}(\delta) - r_{intake}$$

$$\text{if } x_{press}(\delta) < r_{plateau},$$

$$\beta(\delta) = 0, \text{ otherwise, } \beta(\delta) = \arctan(x_{auxiliary}(\delta) / y_{auxiliary}(\delta))$$

$$x_{tool}(\delta) = x_{press}(\delta) - (r_{press} - r_{tool}) * \sin\beta(\delta)$$

$$y_{tool}(\delta) = y_{press}(\delta) - r_{press} * \cos(\delta)$$

in which

δ—angle of rotation of tool, $r_{plateau}$—plateau radius $r_{intake}$—press roll radius $r_{tool}$—tool radius $x_{tool}$—x coordinate of the tool=f(δ)

$Y_{tool}$—y coordinate of tool=f(δ)

$r_{press}$—press roll radius $x_{press}$—x coordinate of the center of die=f(δ)

$y_{press}$—y coordinate of the center of die=f(δ)

β—angle pressure=f(δ)

$x_{auxiliary}$—auxiliary coordinate to x direction=f(δ)

$y_{auxiliary}$—auxiliary coordinate to y direction=f(δ)

The die head contour can be manufactured with the coordinates δ, $x_{tool}$, $y_{tool}$ in the case of, e.g., a circular intake curve.

The representation at the top in FIG. 1 shows the axis of rotation and longitudinal axis 5 of the press roll 4 and the axis of rotation 6 of the tool 3, and the representation at the bottom of that figure shows the center of rotation 7 of the die head 1 rotating on the flight or travel circle radius 8 and a longitudinal axis 17 of the die. The instantaneous surface lines of the press roll 4 extending through the instantaneous contact points 9 between the die head 1 and the press roll 4 under the action of the press roll 4 on the die head 1 are formed on the head surface 2 of the die head 1 as a set of consecutive contact lines 11 by means of the tool 3. The set of consecutive contact lines 11 are a mathematical representation of a three dimensional surface formed by a combination of lines.

Figure 2:
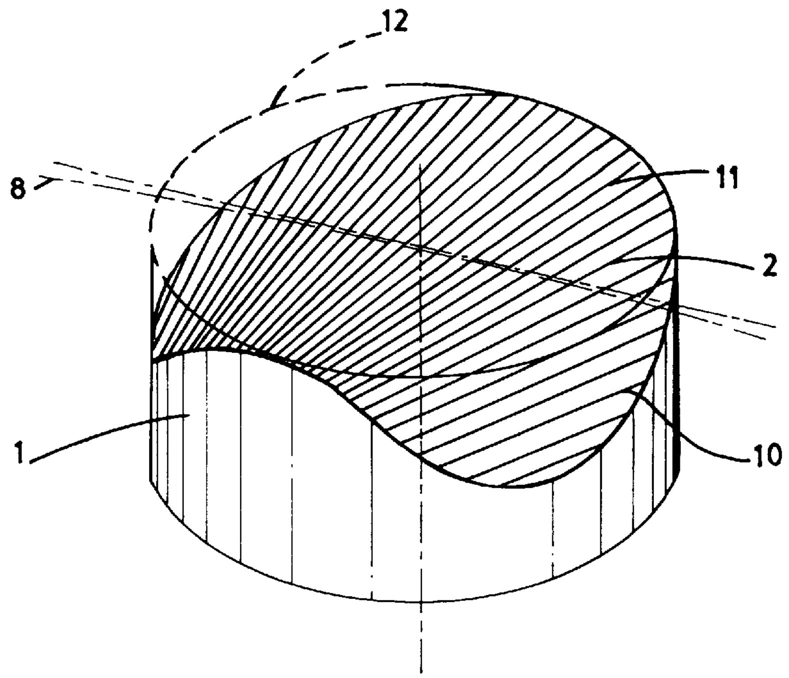
FIG. 2 is a perspective view of a plateau-less die head surface according to the present invention.

FIG. 2 shows the perspective view of the head surface 2 of the plateau-less die head 1 with the set of consecutive contact lines 11 formed from the contact lines 10. The flight circle radius is shown here as well. The initial cylinder 12 for the die head I and the flight circle radius 8, on which the die heads 1 revolve around the center of rotation 7 of the rotary press, are indicated by broken lines. The contact lines 10 are cut out of the initial cylinder 12 by means of the tool 3, e.g., a cylindrical grinding or milling tool, and the previous punctiform contact is transformed into a pure linear contact by means of the continuous contact lines 10. The toroidal or rotationally symmetrical shape of the die head in the prior art is replaced by an arched shape with straight contact lines 10.

Figure 3:
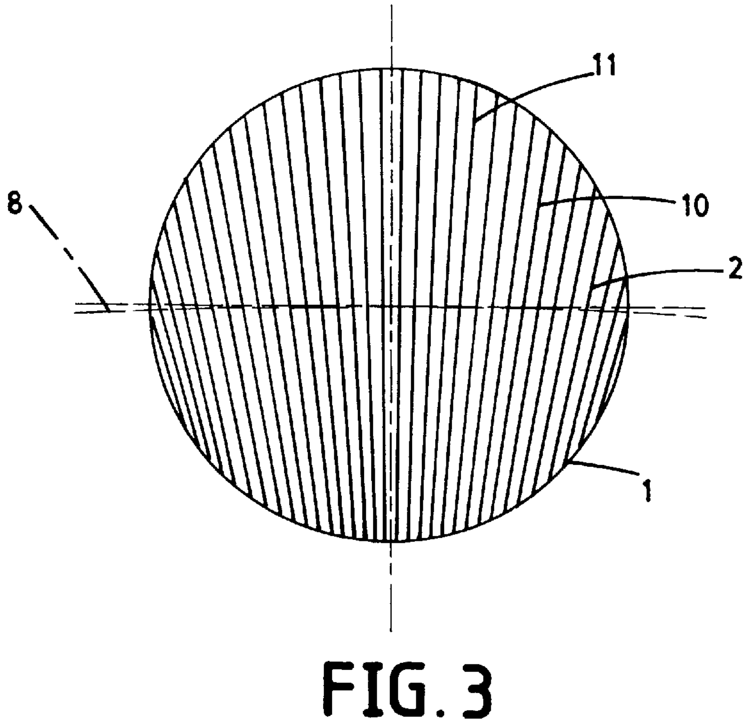
FIG. 3 is a top view of the die head surface according to FIG. 2.
Figure 4:
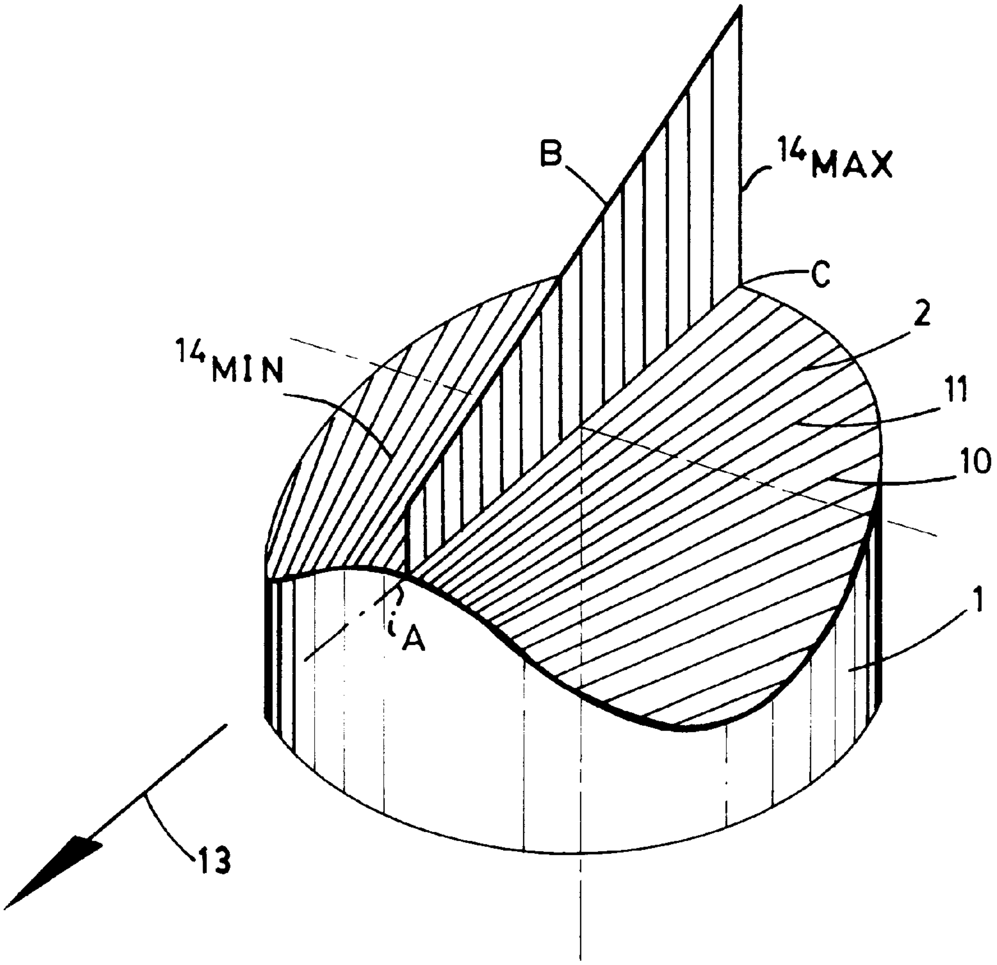
FIG. 4 is a perspective view corresponding to FIG. 2 with graphic representation of the maximum and minimum radii of curvature.

FIG. 3 shows the top view of the head surface 2 of the die head 1 with the set of consecutive contact lines 11. The radii of curvature 14 in the circumferential direction varies along the engagement contact line 10 as shown in FIG. 4 for the engagement contact line 10 at which the maximum pressing force occurs between the press roll 4 and the die head 1 during the pressing process. The smaller radii of curvature $\mathbf{14}_{min}$ along this selected engagement contact line 10 occurs for the side of the die head 1 tilted toward the center of rotation 7, indicated by arrow 13, of the rotary press. The maximum radius $\mathbf{14}_{max}$ occurs at the opposite side. This geometry of the die head 1 leads to a higher Hertzian stress on the inner side of the die head 1 directed toward the center of rotation 7 because of the smaller resulting radius of curvature (minimum radius of curvature $\mathbf{14}_{min}$) of the press roll 4 and the die head 1 on this side of the die head 1 than on the outer side of the die head 1. For compensation, the engagement contact lines 10 to be manufactured are prepared with a slight tilt or angle, so that gaping 18 occurs on the inner side of the die head 1 in the unloaded pair formed by the press roll 4 and the die head 1 and a nearly uniform course of the Hertzian stress is obtained under the contact line 10 at the maximum pressing force.

Figure 5:
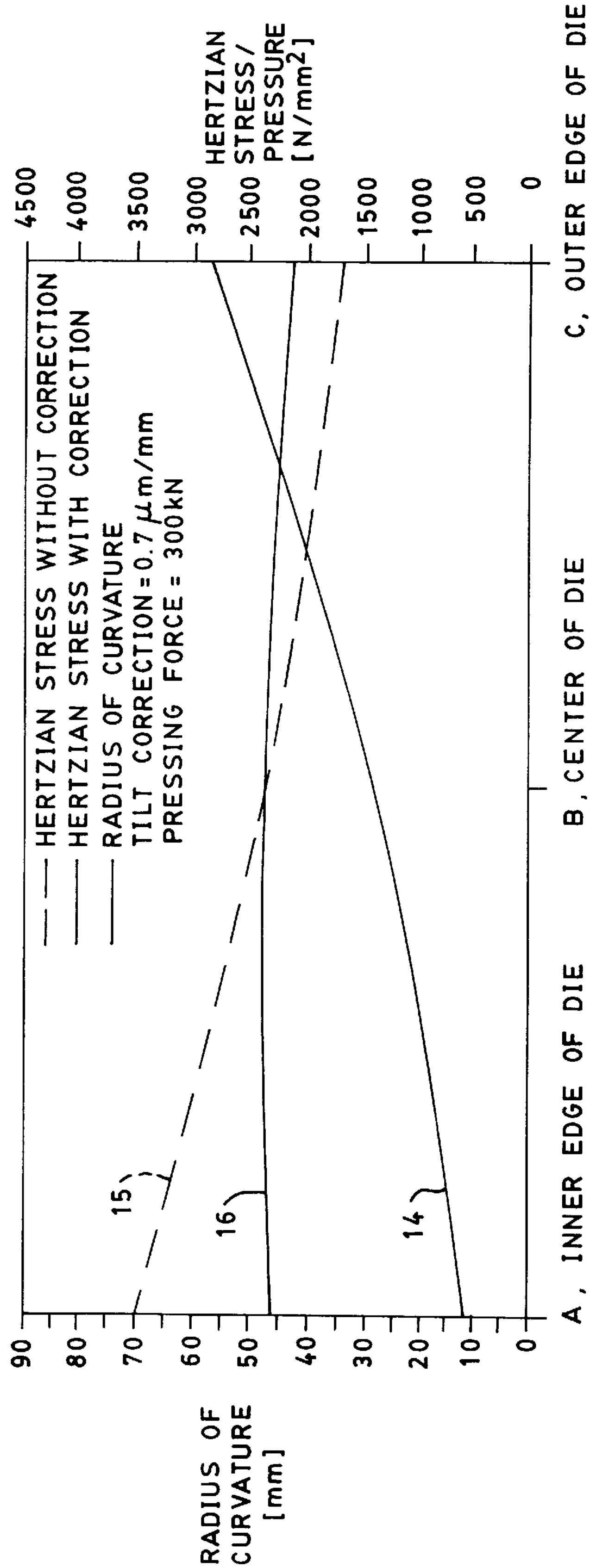
FIG. 5 is a diagram of the radius of curvature and of the Hertzian stress over the cross section of the die head.
Figure 6:
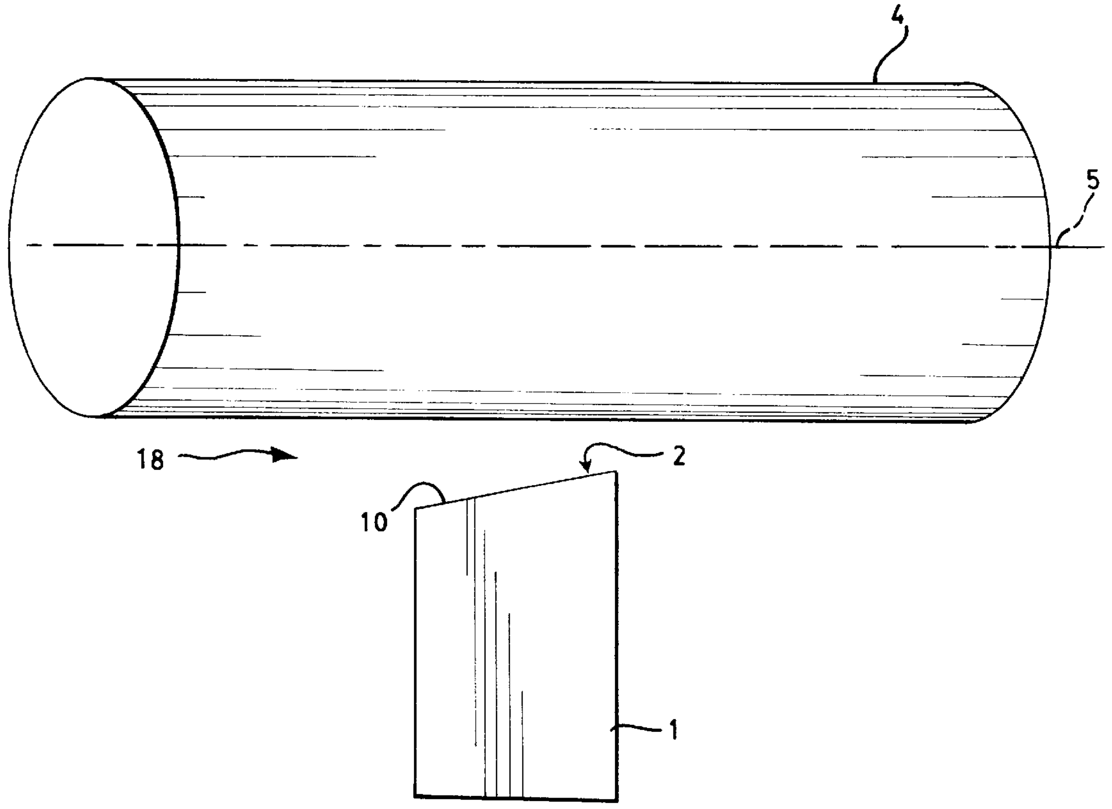
FIG. 6 is a side view of the press roller and the die head.

FIG. 5 is a graph of the contact line 10 A-B-C- at a maximum pressing force of 300 kN on the abscissa verses, the course of the radius of curvature 14 of the die head 1, the course of the Hertzian stress 15 without tilt correction, and the course of the Hertzian stress 16 with tilt correction on the ordinate of a manufacture pair of press roll 4 and die bead 1. The substantial reduction in the maximum Hertzian stress despite the stronger pressing force and the additional reduction in the local maximum Hertzian stress at the inner edge of the die due to the correction performed at equal overall load can be clearly recognized. The correction is 0. 7 $\mu$m/mm.

While specific embodiments of the invention have been shown and described in detail to illustrate the application of the principles of the invention, it will be understood that the invention may be embodied otherwise without departing from such principles.

APPENDIX

| LIST OF REFERENCE NUMBERS |
|---|
| 1 Die head |
| 2 Head surface |
| 3 Tool |
| 4 Press roll |
| 5 Axis of rotation of the press roll |
| 6 Axis of rotation of the tool |
| 7 Center of rotation of the press |
| 8 Flight circle path |
| 9 Contact point |
| 10 Contact line |
| 11 Set of consecutive contact lines |
| 12 Starting cylinder |
| 13 Arrow to the center of rotation of the press |
| 14 Radius of curvature |
| 15 Hertzian stress without tilt correction |
| 16 Hertzian stress with tilt correction |

What is claimed is:

1. A process for creating a head surface of a die cooperating with a cylindrical press roll for a rotary press, the process comprising the steps of:

determining a shape of the head surface to have the press roll contact the head surface along a plurality of points of said head surface, said plurality of points forming a contact line, said shape of head surface being formed of a plurality of consecutive said contact lines, said plurality of contact lines are tilted to have one end spaced from the press roll by a few hundredths of one millimeter toward a side of the head surface directed toward a center of rotation of the rotary press;

shaping the head surface of the die to include said plurality of contact lines.

2. A process in accordance with claim 1, wherein:

the press roll is formed with a plurality of surface lines;

said plurality of contact lines are substantially parallel with said surface lines of the press roll.

3. A head surface of a die cooperating with a press roll of a rotary press, the head surface comprising:

a shape to simultaneously have a plurality of points of said head surface contact the press roll, said plurality of points forming a contact line, said shape of head surface being formed of a plurality of consecutive said contact lines said plurality of contact lines, are tilted to have one end spaced from the press roll by a few hundredths of one millimeter toward a side of the head surface directed toward a center of rotation of the rotary press.

4. A rotary press comprising:

a press roll;

a die movable past, and into contact with, said press roll, said die including a head surface having a shape to simultaneously have a plurality of points of said head surface contact said press roll as said die moves past said press roll, said plurality of points forming a contact line, said head surface of said die is formed of a plurality of consecutive said contact lines, said shape of said head surface maintains Hertzian stress substantially constant across said head surface;

said die moves in a circular arc with respect to said press roll;

said head surface has an inner radial portion and an outer radial portion according to said circular arc; and said contact lines and said press roll define a gap on said inner radial portion of said head surface in an unloaded condition.

5. A rotary press in accordance with claim 4, wherein:

said contact line extends completely across a diameter of the die.

6. A rotary press in accordance with claim 4, wherein:

said head surface is asymmetrical about a longitudinal axis of said die.

7. A rotary press in accordance with claim 4, wherein:

said shape of said head surface maintains Hertzian stress substantially constant across each of said contact lines.

8. A rotary press in accordance with claim 4, wherein:

said plurality of contact lines are angularly spaced from a longitudinal axis of said press roll.

9. A rotary press in accordance with claim 4, wherein:

said gap is of a magnitude to cause contact between said press roll and said outer radial portion when said die passes said press roll and said inner radial portion defines a gap with said press roll during said unloaded condition.

10. A rotary press in accordance with claim 4, wherein:

said gap has a magnitude of approximately a few hundredths of one millimeter.

11. A rotary press accordance with claim 8, wherein:

said die moves in a circular arc with respect to said press roll;

said angular spacing of said plurality of contact lines is in a plane substantially perpendicular to a plane of said circular arc.

12. A rotary press in accordance with claim 4, wherein:

said head surface extends substantially completely over an axial end of the die.

13. A rotary press in accordance with claim 4, wherein:

said head surface extends substantially completely diametrically across an axial end of the die.

14. A rotary press in accordance with claim 4, wherein:

said head surface is curved.

15. A rotary press in accordance with claim 4, wherein:

said head surface is curved in circumferential direction of the rotary press.

16. A rotary press in accordance with claim 4, wherein:

said head surface is curved in two orthogonal directions.

* * * * *